US009342599B2

(12) United States Patent
Elliott

(10) Patent No.: US 9,342,599 B2
(45) Date of Patent: May 17, 2016

(54) METHODS AND SYSTEMS FOR CENTRALIZED AUDIO AND VIDEO NEWS PRODUCT COLLECTION, OPTIMIZATION, STORAGE, AND DISTRIBUTION

(76) Inventor: Thomas Stetson Elliott, Washington, DC (US)

(*) Notice: Subject to any disclaimer, the term of this patent is extended or adjusted under 35 U.S.C. 154(b) by 791 days.

(21) Appl. No.: 13/481,239

(22) Filed: May 25, 2012

(65) Prior Publication Data

US 2012/0303617 A1    Nov. 29, 2012

Related U.S. Application Data

(60) Provisional application No. 61/489,866, filed on May 25, 2011.

(51) Int. Cl.
*G06F 17/30* (2006.01)

(52) U.S. Cl.
CPC .... *G06F 17/30864* (2013.01); *G06F 17/30017* (2013.01); *G06F 17/30286* (2013.01)

(58) Field of Classification Search
CPC .............. G06F 17/30286; G06F 17/30864; G06F 17/30017
USPC ............... 707/640, 693, 705, 736; 705/35, 51
See application file for complete search history.

(56) References Cited

U.S. PATENT DOCUMENTS

| | | | | |
|---|---|---|---|---|
| 6,181,867 B1* | 1/2001 | Kenner | ............. | G06F 17/30017 701/770 |
| 6,496,856 B1* | 12/2002 | Kenner | ............. | G06F 17/30017 707/769 |
| 6,842,761 B2* | 1/2005 | Diamond | ............. | G06F 17/3002 707/704 |
| 6,847,977 B2* | 1/2005 | Abajian | ............. | G06F 17/3002 707/737 |
| 2008/0154969 A1* | 6/2008 | DeBie | ............. | G06F 17/30085 707/640 |
| 2008/0281872 A1* | 11/2008 | Mizuno | ......................... | 707/693 |
| 2009/0300021 A1* | 12/2009 | Vasko et al. | .................. | 707/770 |
| 2010/0250633 A1* | 9/2010 | Hannuksela et al. | ......... | 707/825 |
| 2010/0306202 A1* | 12/2010 | Lee | ............ | G06F 17/30179 707/741 |
| 2011/0040811 A1* | 2/2011 | Leigh | ............. | G06F 17/30227 707/822 |
| 2011/0202583 A1* | 8/2011 | Provencher et al. | .......... | 707/827 |
| 2011/0276573 A1* | 11/2011 | Wang | .................. | G06F 11/1453 707/740 |
| 2011/0282853 A1* | 11/2011 | Masao | ............. | G06F 17/30386 707/705 |
| 2011/0282894 A1* | 11/2011 | Broussard | ......... | G06F 17/30106 707/769 |
| 2012/0016838 A1* | 1/2012 | Arai | ...................... | G06F 3/0611 707/610 |
| 2012/0036161 A1* | 2/2012 | Lacapra | ............ | G06F 17/30194 707/781 |
| 2012/0101944 A1* | 4/2012 | Lin et al. | ......................... | 705/44 |
| 2012/0101995 A1* | 4/2012 | Agetsuma et al. | ............ | 707/644 |
| 2012/0209898 A1* | 8/2012 | Leigh | ........................... | 707/827 |
| 2012/0303617 A1* | 11/2012 | Elliot | ............................ | 707/736 |

* cited by examiner

*Primary Examiner* — Shahid Alam
(74) *Attorney, Agent, or Firm* — Ditthavong & Steiner, P.C.

(57) ABSTRACT

Methods and systems are disclosed for collecting media and news products such as audio sound bites and/or video clips. Methods and systems in accordance with an embodiment include organizing, categorizing, or cataloguing the collected news products. Further, methods and systems include storing such multimedia products in a searchable manner so that they may be easily found and retrieved.

20 Claims, 4 Drawing Sheets

METHODS AND SYSTEMS FOR CENTRALIZED AUDIO AND VIDEO NEWS PRODUCT COLLECTION, OPTIMIZATION, STORAGE, AND DISTRIBUTION

RELATED APPLICATIONS

The disclosure claims priority to U.S. Provisional Application No. 61/489,866, the disclosure of which is incorporated by reference herein in its entirety.

FIELD OF DISCLOSURE

The disclosure relates to methods and systems for multimedia centralization, storage, and distribution. In particular, the disclosure relates to methods and systems for collecting, organizing, optimizing, storing, and serving audio and video news products.

BACKGROUND

A vast majority of media outlets rely to some extent on sound bites and/or video clips for media production. For example, nearly all of America's talk-radio shows—from small-time college productions to the RUSH LIMBAUGH SHOW—rely to some extent on sound bites. Culling sound bites can be a time-consuming and laborious process. Yet, producers typically cut identical sound bites for different shows—attempts by producers to personally create a catalog often results in overly complicated and unwieldy file systems. Even if such a catalog is at all useful, it is likely to aid only the producer who created the particular catalog.

SUMMARY

As the news industry transitions from print media to digital media, news providers increasingly desire large amounts of specific multimedia content, on demand. An exponentially increasing volume of news and multimedia content is available, which can makes locating specific, e.g., sound bites difficult. It is now common, for example, for media outlets that provide written copy to supplement their written copy with audio and/or video content. A comprehensive search of available news products related to a particular subject is similarly difficult.

There is a need for collecting, centrally storing in a searchable manner, and distributing news products. More specifically, there is a need for methods and systems that accommodate collection, search, and distribution of audio clips and/or sound bites, transcripts, published studies, and other news products. Such methods and systems, e.g., would allow media and news outlets to reduce costs while maintaining or enhancing productive capacity. Further, there is a need for a system for collecting, refining or optimizing, storing, and serving news product.

Accordingly, methods and systems are disclosed for collecting media and news products such as audio sound bites and/or video clips. Methods and systems in accordance with an embodiment include organizing, categorizing, or cataloguing the collected news products. Further, methods and systems include storing such multimedia products in a searchable manner so that they may be easily found and retrieved. For example, the news products may be stored in a searchable database. A user may search the database to retrieve a desired news product, or a number or news products related to a particular person, place, subject, and/or event.

In another embodiment, methods and systems may include receiving raw news data from sources, collecting the raw news data, and storing the news data in a central database. The news data may be edited, optimized, and/or refined to form a news product for storage, serving, and/or distribution.

Exemplary embodiments are described herein. It is envisioned, however, that any system that incorporates features of methods and systems described herein are encompassed by the scope and spirit of the exemplary embodiments.

DETAILED DESCRIPTION

Figure 1:
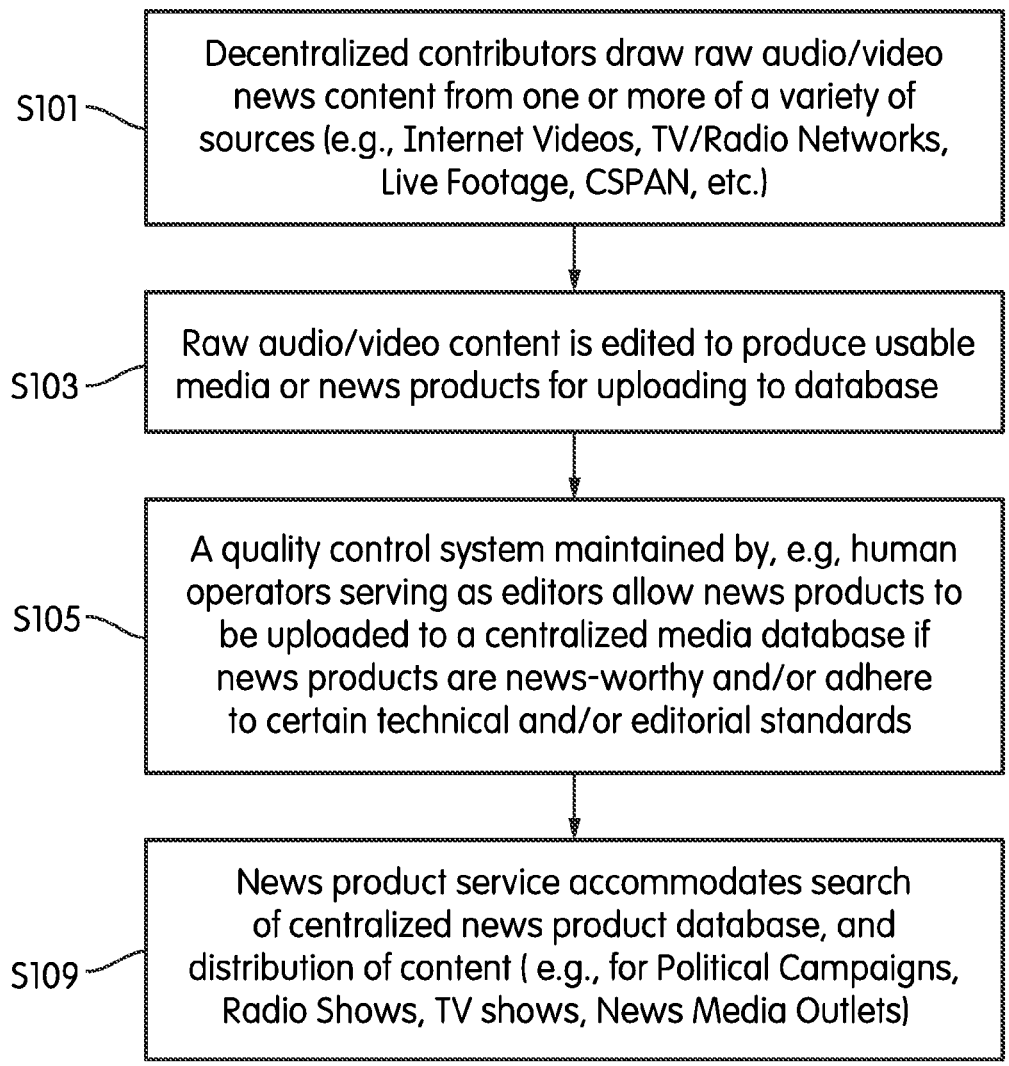
FIG. 1 shows a overview of news data processing in a system in accordance with an embodiment.

Exemplary embodiments are intended to cover all alternatives, modifications, and equivalents as may be included within the spirit and scope of the methods and systems as described herein.

Reference is made to the drawings to accommodate understanding of methods and systems for collecting, optimizing, storing, and presenting and/or distributing media content or news products. In the drawings, like reference numerals are used throughout to designate similar or identical elements. The drawings depict various embodiments of illustrative methods and systems.

Methods and systems include receiving, organizing, optimizing, categorizing, cataloguing news products. Further, methods and systems include storing such multimedia products in a searchable manner so that they may be easily found and retrieved. For example, the news products may be stored in a searchable database. A user may search the database to retrieve a desired news product, or a number or news products related to a particular person, place, subject, and/or event.

News products such as sound bites and/or video clips may be produced by decentralized contributors. For example, news products may be produced from internet videos, networks, live footage, and commercial news outlets such as CSPAN. News product may comprise audio, video, transcripts, published studies and other similar content. Methods and systems include receiving and collecting raw news data, editing the news data to produce news products, and saving the news products in a centralized database for search and retrieval. A quality-control system may be implemented to maintain a quality standard of stored news products.

As shown in FIG. 1, in an embodiment, raw news data may be contributed by sources that are decentralized from a central media provider. For example, decentralized contributors may draw raw audio/video news content from one or more of a variety of sources such as internet video, television and/or radio networks, live footage from media outlets and/or individual persons, news outlets such as CSPAN, etc. at S101. The raw news data may be in the form of audio and/or video electronic formats including mp3, mp4, and other suitable electronic formats now known and later developed. The sources, or decentralized contributors, may be incentivized to contribute such data and/or refine news data to produce and provide media or news products based thereon. For example, original contributors of content may receive monetary compensation, e.g., a percentage of particular news product sales.

The raw media or news data may be edited into refined or optimized news products, e.g., edited audio and/or video clips at S103. Similarly, previously produced media products may constitute raw media data insofar as such previously produced are edited at S103 to create a different and/or further refined or optimized news product.

The news product may be categorized, identified, tagged, organized, and/or stored in a centralized media or news product database. A system comprising the database may be associated with a remotely accessible website front-end. Contributors may upload content by way of the front-end at S101, and users may search the centralized news product database, view excerpts, transcripts or samples, and retrieve content by way of a website front end.

The system may be configured to process media such as sound and/or video clips uploaded or submitted by contributors at S105. For example, the system may include a quality control gateway that permits sound bites, video clips, news stories, etc., to be stored only if the news products comply with certain standards. The system may be configured to organize received raw news data and refined news products. Submitted content may be identified and serialized, e.g., when a news product is received, the electronic file may be tagged and/or assigned an identifier. The content may be processed to determine whether the database has already received the same raw news data, or already stores the same news product, or a better quality news product. Accordingly, the database may include selectively stored news product content.

In another embodiment of methods and systems, the system may be configured to determine whether a newly submitted raw news data is the same as an already stored product, but of better quality. The system may be configured to replace said sub-quality news product.

The quality control gateway may comprise a controller that executes instructions that facilitate news product submission and quality control processing. In an embodiment, human operators may facilitate certain processing of submitted and stored news product files. FIG. 1 shows at S105 that a quality control system maintained by, for example, human operators serving as editors and/or content gatekeepers may allow news products to be uploaded to a centralized media database. The content gatekeepers may determine what media provided by decentralized sources may be uploaded to the central database. For example, human operators may allow media products to be uploaded to a central database at S105 is the products are news-worthy for example, and/or adhere to certain technical and/or editorial standards. The news products need not be news worthy, per se. For example, systems and methods may be configured for receiving, editing, filtering or gatekeeping, and organizing and storing any media product whether news-worthy or not.

The news product may be stored in a central database system. For example, news products may be centrally stored in accordance with the results of the submission and quality control or gatekeeping, which may facilitate categorization and/or organization of news product files received from decentralized contributors. The news product may be stored to facilitate search of submitted news products and multimedia at S109. For example, news articles and studies may be stored and categorized by topic, author, speaker, etc. As decentralized contributors submit media content and news products, the database may comprise an immense back-catalogue of news products, and continuous updates.

FIG. 1 shows that the database may accommodate commercial users by, for example, permitting a news producer to obtain a breaking-news sound bite from a politician, and also retrieve relevant comments made by the same politician throughout his/her career from a news product service includes and can serve media files to and from the central database. Accordingly, a producer may assemble an entire news piece in minutes. As such, a central database of news products in accordance with an embodiment may improve efficiency for radio shows, television shows, and other news media outlets.

As shown in FIG. 1, the database and system may also accommodate individual users. For example, a political candidate may use the centralized database of news products to facilitate efficient search and retrieval of, e.g., a political opponent's record, audio/visual clips ripe for advertisements, and the latest studies on particular issues. The centralized database of news products and multimedia content facilitated by a decentralized user database may similarly aid think tanks, lobbying groups, trade associations, and others.

Another embodiment in accordance with methods and systems may include facilitating a search of stored news products by a graphical user interface provided on a display. The display may be part of a proprietary system, or a user's desktop computer, media system, work station, mobile device, or any system configured for accessing web pages. For example, a news product database index may be presented to a user to enable news product searching. In an embodiment, the system may be configured to allow a user to conduct a key word search, e.g., a natural language or terms and connector search, of the news product database. The system may present a user with a display of search results from which the user may select one or more news products. Systems may accommodate presenting a user with an excerpt, sample, or transcript of a news product to allow the user to sample the news product before, e.g., download or file transfer. Further, systems may accommodate selection and transfer of one or more particular news products.

Methods and systems in accordance with another embodiment include receiving edited news products from decentralized contributors. The news products may be edited into useable clips by the decentralized contributors. The news products may be submitted to a central news product system, which may include a processing gateway and a central database system. The gateway may comprise a controller and/or a human operator. The gateway may process received files to determine whether the received files are news products that are suitable for storage on the central database. For example, the received files may not be stored if they are redundant or are of unacceptable quality. Files may be stored whether or not the media embodied therein is considered by, e.g., the human operator/gatekeeper(s) to be news-worthy. The files may be processed, including identification and classification, for storage in a searchable database.

The central database may be configured for searching of stored content; presentation of search results; and selection of particular files for distribution. In an embodiment, distribution of stored content may be limited to authorized users. In another embodiment, distribution may be limited to authorized users, and non-authorized users may, upon demand, be presented with a preview, e.g., an excerpt of a news product. The user may be required to purchase the news product before being authorized to receive the complete news product.

Methods and systems in accordance with another embodiment include presenting stored, edited news products to users, and facilitating a search of the stored edited news products. For example, a news product database index may be presented to a user to facilitate news product searching. Systems may present a user with a display of search results from which the user may select one or more news products. Systems may accommodate presenting a user with an excerpt, sample, or transcript of a news product to allow the user to sample the news product before, e.g., download or file transfer.

In another embodiment, methods and systems may include a news product system having a centralized database of news products for browsing, sampling, and/or and distribution. Methods and systems may include receiving raw news data from a contributor or other raw news data source. The raw news data source may be, e.g., a video or news clip. The video or news clip may be edited. For example, the contributor may have edited the raw data to produce a video clip or sound bite. Contributors may submit raw news content, which is received at a system gateway. Systems may be configured to provide a media editing service to users.

Systems may be configured to provide users with a service for editing media content. For example, systems and methods may include providing a user with a service wherein the system is configured to accept a file or link to a file for receiving and/or retrieving media content such as raw news data. The content may be in any now known or later developed audio and video file formats. Systems may be configured to receive from a user an indication of what edits are to be made to the file. For example, systems may be configured to prompt a user by audio and/or visual display to enter a start and/or end time for cropping an audio or video file by way of a user interface. The system may automatically crop the file in accordance with such user-entered instructions. For example, the system may prompt a user to indicate that the system is to process the provided raw data file to produce a media product based on the user-entered instructions by way of a suitable user interface, such as a graphical user interface connected to input devices such as a keyboard and/or a touchscreen interface(s).

The system gateway may include a controller for automatically processing raw news data received by the news product system. The system may include a human operator for carrying our quality control functions. For example, each received file may be identified for tracking, and organization. The system gateway may include a quality control system for filtering received content to maintain a desired threshold of news product quality. Further, the system gateway may be used to prevent duplicate news products from being stored in the database or made available for editing or presentation.

Raw news data that is sent to the news product system from contributors may be further tagged, edited, refined, and/or optimized to produce a news product. The news product system may be configured to organize and store the news products in a centralized database.

The news products may be stored in a searchable database. The database may be accessible to users. For example, the news product system may include a web page front-end that allows users to access the product system and/or database for submitting raw news product, browsing stored news product, and/or requesting for download and/or downloading stored news product(s).

Figure 2:
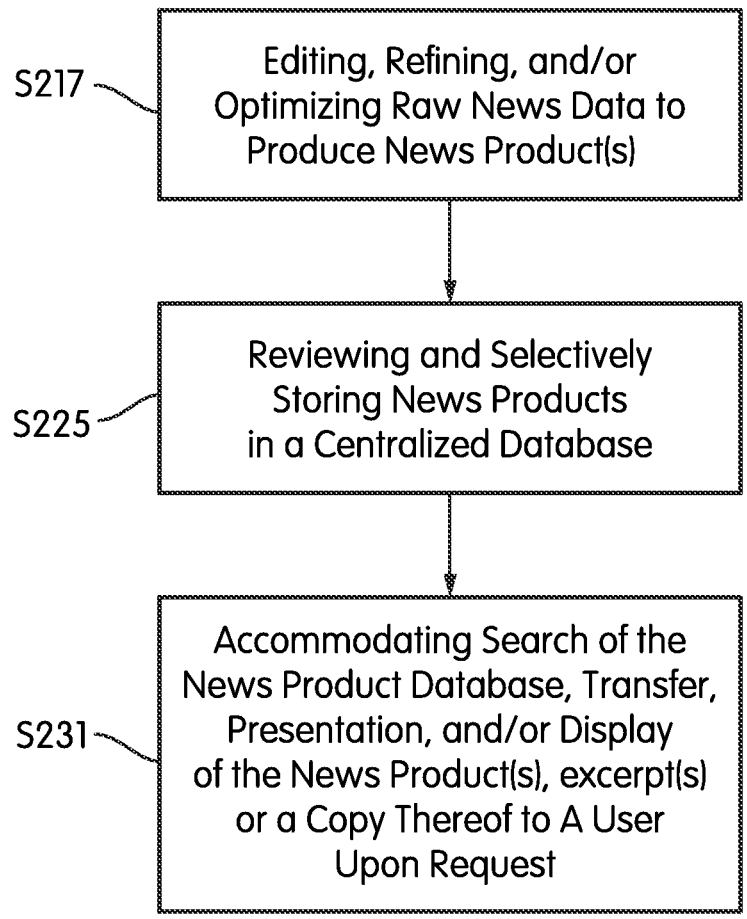
FIG. 2 shows a method of news product generation, centralization, storage, and database maintenance in accordance with an exemplary embodiment.

As shown in FIG. 2, in an embodiment of methods and systems, raw news data may be edited, refined, and/or optimized to produce news products such as sound clips or video clips at S217. News products may at least be more suitable for media broadcast and/or public consumption than raw news data. Further news products may be optimized news data, e.g., sound or video clips having balanced and normalized audio levels and/or may be cropped to a desired portion of original audio or video data.

The edited news product may be reviewed for content and quality at S225. For example, the edited news product may be reviewed to determine whether a quality of the news product meets a threshold quality required to be included in the central database. The edited news product may be reviewed to determine where in the database the file will be stored, to identify the product, and/or to determine whether a same or similar news product already exists in the database.

As shown in FIG. 2, methods and systems include accommodating searching the database, viewing displays and/or descriptions of edited news products, and requesting and/or downloading copies of sound and/or video news products at S231. Accordingly, raw news data may be collected and refined to produce news products that are selectively stored in a central database. The central database may be configured to accommodate searching of the news products, viewing or excerpts and/or descriptions of news products, sharing, rating, and/or commenting upon stored news products, and transfer and/or downloading of store news products.

Figure 3:
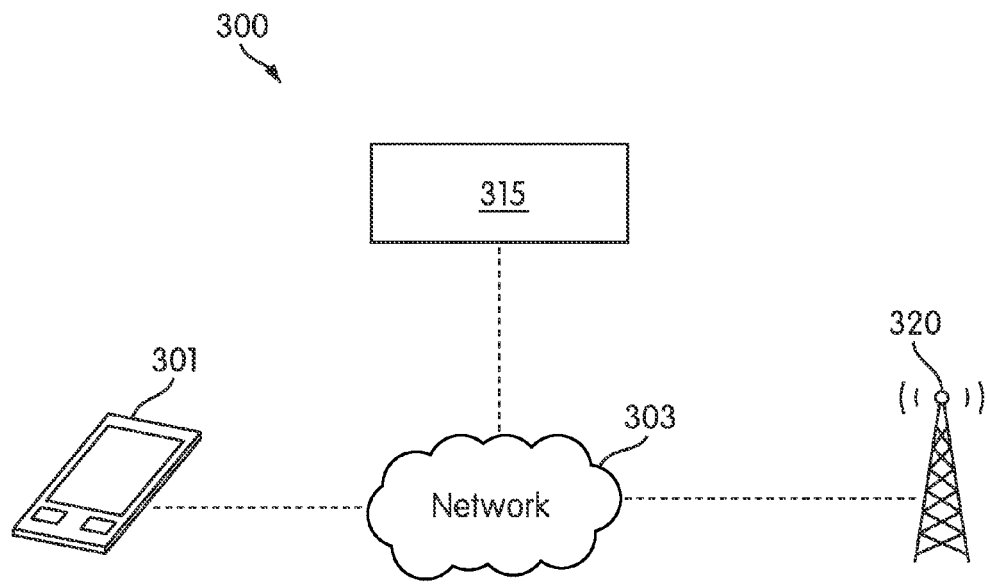
FIG. 3 shows a diagrammatical view of a media product processing system in accordance with an embodiment.

FIG. 3 shows a system useful for collecting media products and providing media products. In particular. FIG. 3 shows a media product system 300 including a user device 301, a media processing system 315, a network-connected commercial consumer 320 such as a radio station or other media outlet, and a telecommunications network 303 such as a the internet. The telecommunications network 303 connects the user device 301, the media processing system 315, and the commercial user 320 for electronic communication along wired and/or wireless networks.

Figure 4:
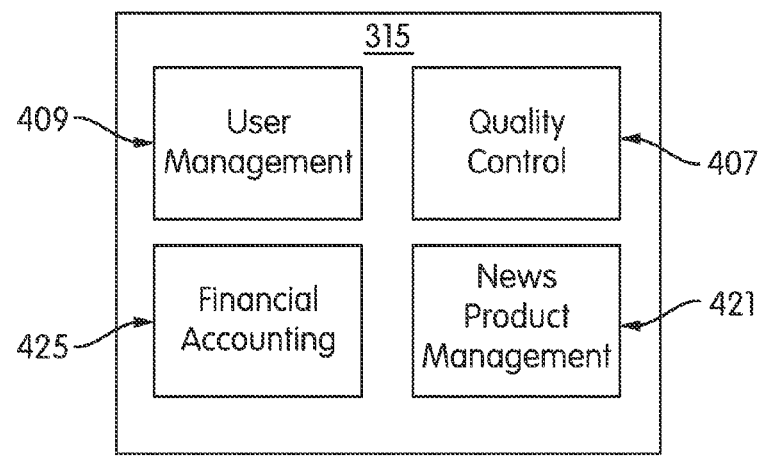
FIG. 4 shows a block diagram view of a media product processing system in accordance with an embodiment.

FIG. 4 shows a block diagram of the media processing system 315 and various subsystems thereof. In particular FIG. 4 shows media processing system 315 having a quality control module 407. The quality control module 407 may comprise human operators and/or automated systems for screening raw and edited media or news data or products.

News products may be judged for quality. For example, news products may be assigned a scaled value for quality comparison with other news products. Users may upload and/or produce news products for central storage, and be rewarded for contribution by receiving incentives based on the assigned values resulting from quality review. User may be provided with motivation or incentive to refine previously produced or uploaded news products. For example, a user be an authorized systems user and may be provided with credits for purchasing access to particular stored content, for example. Quality may be judged based on a length of a news product file such as an audio or video file, on associated metadata that enables efficient search and retrieval of the particular news product, popularity or demand of the news product, etc.

Systems may include a user management module 409. The user management module 409 may store, communicate, and manage system user and user account information. For example, users may register with a centralized account for access to or use of the system and/or news data stored by the system. The user management module may receive, store, and provide user information.

Users may establish a user account that includes a data storage service. For example, users may be provided an amount of data storage space on data storage means provided by system operators. Users may be provided with a means for making electronic payment for news product transactions, and for receiving payment or credits such as those receivable for incentive programs intended to motivate a decentralized user base to provide raw media or news data, produce edited media or news products, upload media or product content, and improve upon stored and searchable/accessible media or news data and/or products, e.g., news clips in the form of video and/or audio data in formats such as mp3, way, mov, mp4, etc.

System 315 may include a financial accounting module 425 for managing user credits, payments, and billings. For example, the financial accounting module 425 may calculate credits earned by a user based on data produced by the quality control module 407. If the user uploads content that is deemed particularly valuable, then the user may accrue credits usable for purchasing access to or use of content or system usage permissions. A user/raw data provider may receive a percentage of every sale of media product by a service operating the system, for example. The user may be paid in credits that may be used to acquire other media products, or used to obtain an amount of other currency, e.g., dollars. The financial accounting module may calculate a bill chargeable to a user for using and/or accessing the system in view of accrued credits. The system may be configured to permit users to pay electronically using bank account information input by a user.

System 315 may include a news product management module 421. The news product management module 421 may be configured to permit receipt of raw media data such as news data in form of now known or later developed file formats such as mp3, mov, mp4, etc. Systems may be configured to enable receipt of already edited news data, or news products. Systems may be configured to edit received media or news products/data to produce media products or news products for storage in a searchable database. Systems may be configured to enable users to edit uploaded news data or media, and receive credit for providing files having valued content and/or enhanced content as media or news products having high quality and/or enhanced formatting such as a metadata having relevant information useful for storage and retrieval of the file.

Figure 5:
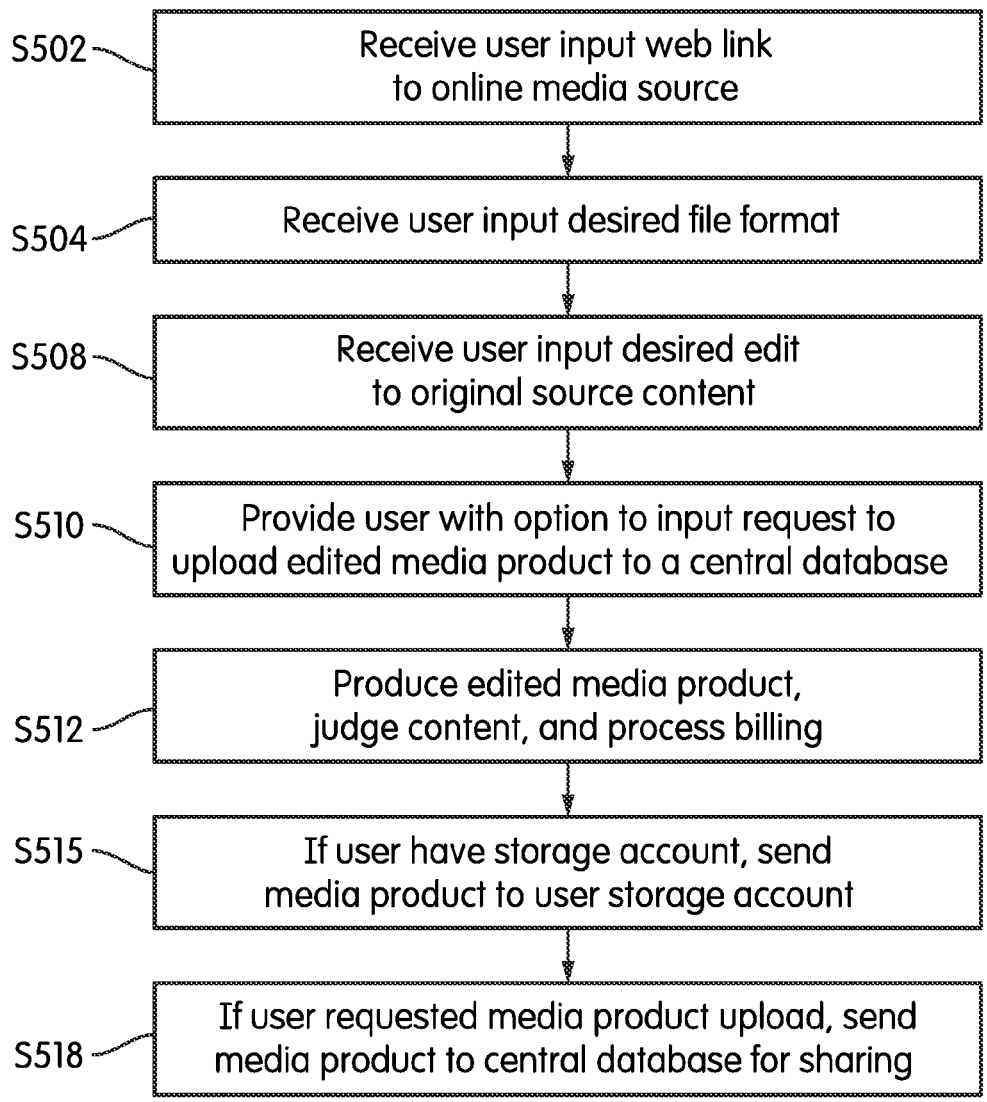
FIG. 5 shows a media product processing methods in accordance with an embodiment.

FIG. 5 shows methods for producing, storing, and providing media and news content in accordance with an embodiment. FIG. 5 shows methods including receiving a user input at a user device such as a network-connected desktop computer terminal, a telephone, or tablet personal computer at S502 providing a file or indicating a file source such as a web address, for example.

Methods may include receiving user input indicating a desired file format of an end media or news product at S504. For example, users may choose a preferred video file format, or a preferred audio file format. Methods may include receiving user edits at S508. For example, systems may be configured to prompt a user to input adjustments to a total length of time of a video clip, or indicate a portion of a video clip that is to be excised.

System may be configured to prompt the user at S510 to indicate whether a media product to be produced by the system as requested will be uploaded and stored on a central database connected to the centralized audio and video media/news product collection, storage, and distribution system. Systems may produce a media product at S512 based on the information input by the user.

The resulting product may be judged by a quality management subsystem or system operator, and/or stored in a central database as indicated by the user. A system financial accounting module may produce a bill based on results from the quality management subsystem and the uploaded content and/or produced media product. Systems may be configured to have a media storage account for receiving and storing produced media content. The media product produced at S512 may be sent to the user at S515 for storage in the user storage account. At S518, the media product may be stored in a centralized database. The database may be searchable by users connected to the system by way of Internet connected device. The system may be accessible on the network from remote devices operated by individual users and commercial entities operating media delivery outlets, for example.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable processing means by which to carry into effect the disclosed media content management systems and methods for familiarity and ease of understanding. Although not required, elements of the disclosed exemplary embodiments may be provided, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks, or implement particular data types, in support of the overall objective of the systems and methods according to this disclosure.

Those skilled in the art will appreciate that other embodiments of the disclosed subject matter may be practiced with many types of networked systems. Embodiments according to this disclosure may be practiced, for example, in network environments, where individual users and commercial entities may form a decentralized media base for providing media and enhancing previously provided content according to instructions input at a user's workstation and/or according to predetermined schemes that may be stored in data storage devices and executed by particular devices.

As indicated above, embodiments within the scope of this disclosure may also include computer-readable media having stored computer-executable instructions or data structures that can be accessed, read and executed by one or more processors, for example, in one or more image forming devices. Such computer-readable media can be any available media that can be accessed by a processor, general purpose or special purpose computer. By way of example, and not limitation, such computer-readable media can comprise storage modules such as RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or via another communications connection, whether wired, wireless, or in some combination of the two, the receiving processor properly views the connection as a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents examples of a corresponding sequence of acts for implementing the functions described in the steps. The exemplary depicted steps may be executed in any reasonable order to effect the objectives of the disclosed embodiments. No particular order to the disclosed steps of the method is necessarily implied by the figures and the accompanying description, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure. For example, the principles of the disclosure may be applied to devices deployed and connected to any number of communications interfaces. In such instances, systems may include some portion of the disclosed system and execute some portion of the disclosed method.

While apparatus and systems for centralized audio and video news product collection, storage, and distribution are described in relationship to exemplary embodiments, many alternatives, modifications, and variations would be apparent to those skilled in the art. Accordingly, embodiments of methods and systems as set forth herein are intended to be illustrative, not limiting. There are changes that may be made without departing from the spirit and scope of the exemplary embodiments.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A media management system useful for audio and video media production, comprising:
   a central storage module for storing electronically formatted audio and video data; and
   a media product management module configured to:
      process, using a processor, communications received from a plurality of decentralized users each with a user interface, wherein the communications comprise electronically formatted raw audio or visual news media obtained from broadcast or publication by a plurality of decentralized news media sources; and
      store a plurality of news media files selected from the electronically formatted raw audio or visual news media in the central storage module, wherein the plurality of selected news media files are stored in a searchable database for retrieval, transfer, presentation, or display to a user selected from a group of authorized users, wherein the plurality of news media files are selected based on a predetermined quality threshold or to avoid redundancy of any one file of the plurality of news media files in the database.

2. The system of claim 1, comprising:
   a user interface for displaying information to a user and receiving user inputs.

3. The system of claim 2, comprising the user interface being connected to a wide area telecommunications network.

4. The system of claim 2, comprising the user interface being connected to the internet.

5. The system of claim 2, comprising:
   a user management module configured to store user data including identification and contact information, the user management module being configured to associate the user data with media data or media products produced by or provided to the system.

6. The system of claim 1, comprising the media product management module being configured to serve news data and news product upon demand from the storage module, the storage module being an electronic file storage database.

7. A method for managing news products, comprising:
   receiving, at a media product management module, electronically formatted raw audio or visual media obtained from a plurality of decentralized news media sources by a plurality of decentralized contributing users, and sent from the plurality of decentralized contributing users for processing by the media product management module using a processor of the media product management module; and
   storing a plurality of news media files selected from the electronically formatted raw audio or visual news media in an electronic database wherein the plurality of selected news media files are stored in a searchable database for retrieval, transfer, presentation, or display to a user selected from a group of authorized users, wherein the plurality of news media files are selected based on a predetermined quality threshold or to avoid redundancy of any one file of the plurality of news media files in the database.

8. The method of claim 7, further comprising:
   receiving a user input for providing raw media data or an edited media product.

9. The method of claim 8, the receiving further comprising receiving a world wide web address directed to a media source.

10. The method of claim 9, the media source being a video file or a music file stored on a remote server or storage module.

11. The method of claim 9, comprising:
   receiving a user input to produce a media product based on the media source in a desired file format.

12. The method of claim 11, comprising:
   prompting the user to input a file format for the media product.

13. The method of claim 11, comprising:
   receiving a request to store the media product in a central database.

14. The method of claim 13, wherein the central database is accessible by authorized users, the central database being remotely accessible by internet.

15. The method of claim 11, comprising:
   receiving a user input including a request to adjust the sourced media to produce the media product.

16. The method of claim 11, comprising the adjusting being an adjustment to a length of an audio or video file.

17. The method of claim 15, comprising:
   producing a media product according to the request to adjust the sourced media.

18. The method of claim 17, the producing comprising:
   retrieving the sourced media file.

19. The method of claim 17, comprising:
   sending the media product to an electronic storage module assigned to the user.

20. The method of claim 17, comprising:
   storing the media product in a central storage module comprising a electronic file database configured to accommodate search and retrieval of media files by authorized users.

* * * * *